July 14, 1970          S. T. SCZERBA          3,520,523
SCRAP PREHEATING AND CHARGING APPARATUS
Filed May 22, 1968
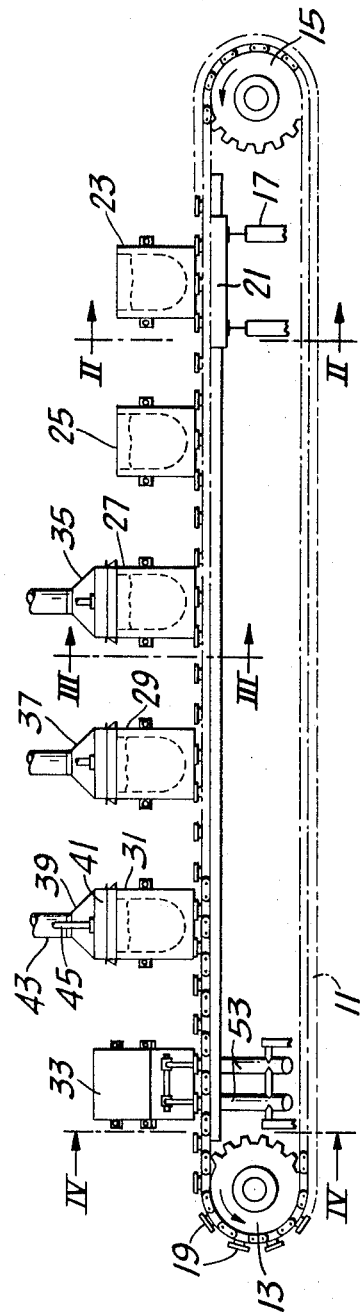
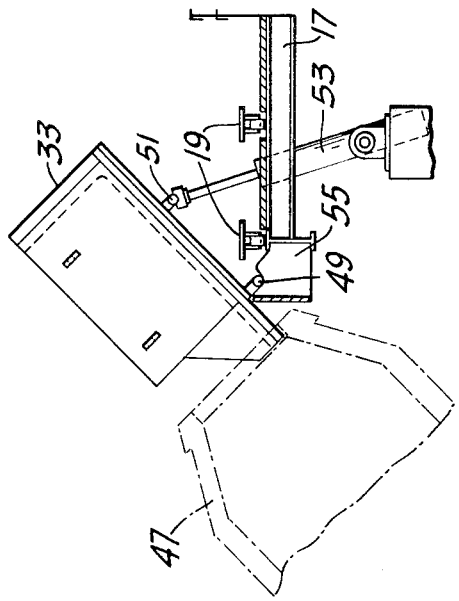
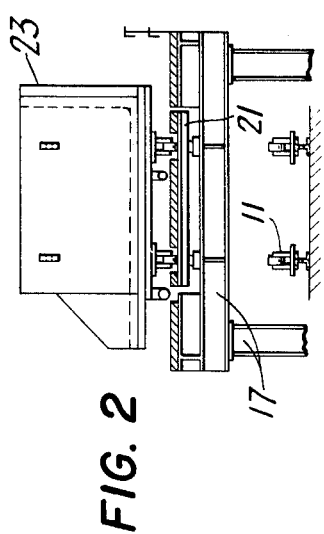
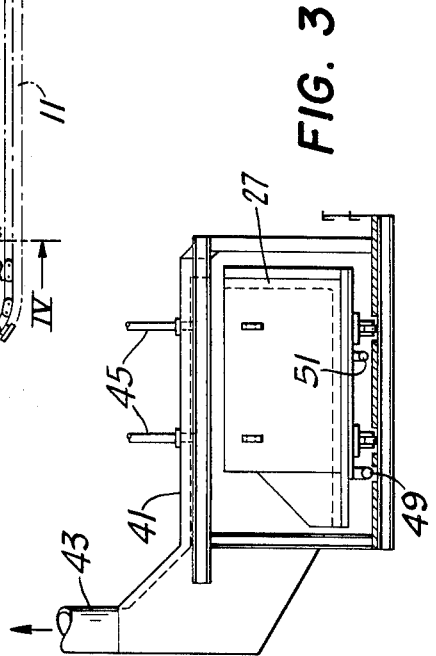
INVENTOR.
STANLEY T. SCZERBA
BY Sherman H. Barber
his Attorney 3,520,523
SCRAP PREHEATING AND CHARGING
APPARATUS
Stanley T. Sczerba, McKeesport, Pa., assignor to Koppers
Company, Inc., a corporation of Delaware
Filed May 22, 1968, Ser. No. 731,144
Int. Cl. C21c 5/00
U.S. Cl. 266—13
5 Claims

ABSTRACT OF THE DISCLOSURE

A plurality of scrap charging buckets move along an endless conveyor belt. They are successively charged with scrap metal; they are moved through a plurality of preheating zones; and, finally, they are tilted upwardly to dump the preheated scrap into a basic oxygen furnace.

BACKGROUND OF THE INVENTION

This invention relates to steelmaking and, more particularly, to preheating and charging scrap into a basic oxygen furnace in which steel is produced.

In electric arc furnaces and also in open hearth furnaces wherein the source of process heat is derived from external sources such as electric arcs and fuel burners, large quantities of scrap metal can be used to produce a melt of steel. But, in the basic oxygen furnace process for making steel, the entire initial heat is derived solely from the hot molten pig iron that is charged into the furnace. If the quantity of scrap metal is too large or is too cold, there will not be enough heat in the hot molten pig iron to carry out the melting process. Hence, the quantity of scrap metal that is used in the basic oxygen furnace is related to the temperature to which the scrap metal is preheated before charging it into the basic oxygen furnace.

Heretofore, apparatus in the prior art that is used to preheat scrap metal includes individual, stationary furnaces, of the vertical shaft furnace type, that are portable to discharge the heated scrap into a basic oxygen furnace. Generally, a plurality of such shaft type furnaces are used. In some instances, it is necessary to discharge prepreheat scrap metal includes individual, stationary furwhich is then conveyed to the furnace location. This type of operation is costly and time consuming.

The present invention in contrast to the prior art, provides a novel apparatus that not only preheats the scrap metal, but also discharges the heated scrap into a basic oxygen furnace in an efficient and economical manner.

SUMMARY OF THE INVENTION

Scrap preheating and charging method and apparatus includes a driven endless belt on which are supported a plurality of scrap charging buckets. The buckets move successively past a scrap loading zone; through one or more preheating zones to a discharging zone where the charging buckets are tilted to discharge the preheated scrap into a basic oxygen furnace. Thereafter the charging buckets are returned to the initial loading zone for resumption of the cycle.

For a further understanding of the invention and for features and advantages thereof, reference may be made to the following description taken in conjunction with the drawing which shows for the purposes of exemplification an embodiment of the invention.

BRIEF DESCRIPTION OF THE DRAWING

In the drawing:
FIG. 1 is a schematic elevational view of one embodiment of apparatus in accordance with the invention that is suitable for carrying into practice the method of the invention;
FIG. 2 is a sectional view along line II—II of FIG. 1;
FIG. 3 is a sectional view along line III—III of FIG. 1; and
FIG. 4 is a view along line IV—IV of FIG. 1.

DETAILED DESCRIPTION

Referring to FIG. 1, endless conveyor belt 11 is looped around end sprocket wheels 13, 15, one or both of which may be driven by a suitable conventional power mechanism. The endless conveyor belt 11 is supported between end pairs of sprockets 13, 15 upon a support structure 17, such as that suggested in FIGS. 1 and 2. The endless conveyor belt 11 is provided with a plurality of support pads 19 on which scrap charging buckets rest.

At the right-hand end of FIG. 1, adjacent the end sprockets 15, there is a conventional load cell scale 21, which is used to weigh the amount of scrap metal charged into each scrap bucket. A plurality of individual scrap buckets 23, 25, 27, 29, 31, 33 are shown in position on the endless conveyor belt 11. The first bucket 23, at the right-hand end of the conveyor belt (FIG. 1), is at the scrap loading station. It is supported on the load cell scale 21. Scrap bucket 25, having been previously loaded and weighed, has moved toward the left, as viewed in FIG. 1. Loaded scrap buckets 27, 29 and 31 are shown at the three scrap preheating stations 35, 37, 39.

Each scrap preheating station 35, 37, 39 comprises a fixed hood 41 that covers the scrap charging buckets. The hoods 41 extend outwardly from the conveyor 11 and merge with stacks 43 through which pass heat and exhaust gases generated during the preheating of the scrap metal.

The hood 41 is equipped with one or more burners 45 at which a combustible mixture is burned. The heat generated by the burning of such mixture preheats the scrap metal in the scrap charging buckets.

The scrap charging buckets 33 (FIG. 1 and FIG. 4) is shown at the charging station, and in the act of discharging heated scrap metal into a conventional basic oxygen furnace 47, which has been tilted appropriately to receive such scrap charge.

The scrap charging buckets 23, 25, 27, 29, 31, 33 are each fitted with a pair of U-shaped rods or legs 49, 51 fitted to the bottom of the buckets. When a scrap preheating bucket, such as bucket 33, arrives at the scrap charging station, a pair of hydraulic or air actuated cylinder-piston arrangements 53 engage the leg 51 and tilt the scrap charging bucket 33 upwardly in a pivoting motion about the leg 49 which engages a fixed fulcrum support 55. As soon as each scrap preheating bucket has been emptied, it is individually removed from the left-hand end of the endless conveyor 11, and is returned to the right-hand end; that is, to the scrap loading station where it is filled again with cold scrap metal.

In operation, the scrap metal in each bucket may be preheated to its desired temperature while the scrap charging bucket is at the first preheating station 35; or, in some applications, each load of scrap metal may be preheated at two or even three of the preheating stations. When the scrap is preheated at one or at two stations, the burners at the remaining station or stations merely maintain the scrap metal at the desired temperature until the scrap is charged into the furnace.

Those skilled in the art will recognize the many novel features and advantages of the invention described herein, among which is that the preheating and charging of a load of scrap metal are carried out by using individual buckets that move on an endless conveyor. This practice eliminates handling the buckets any more than is necessary.

Further, since preheating and charging are accomplished with the use of a single bucket, it is not necessary to discharge the preheated scrap from a heating furnace into a charging bucket as is required when one follows the teaching of the prior art.

Further, the scrap preheating and charging buckets move to the basic oxygen furnace. It is not necessary to disconnect preheating equipment, pick up the preheater while it is loaded with scrap material, and then convey it to a basic oxygen furnace location.

Further, preheating may take place at more than one station thereby providing for more efficient heating of scrap metal to a desired temperature in a shorter period of time.

Although the invention has been described herein with a certain degree of particularity, it is understood that the present disclosure has been made only as an example and that the scope of the invention is defined by what is hereinafter claimed.

What is claimed is:

1. Apparatus for preheating and charging scrap metal into a metallurgical furnace comprising:
   (a) a driven endless conveyor having one end located adjacent said furnace;
   (b) at least one scrap preheating and charging receptacle adapted to be supported on said conveyor;
   (c) a heating zone adjacent said conveyor including means for heating scrap metal in said receptacle as it passes said zone;
   (d) means to remove said receptacle from said conveyor; and
   (e) means adapted to cooperate with said removing means to simultaneously tilt said receptacle to discharge the heated scrap metal into said furnace as said receptacle moves oppositely said furnace.

2. The invention of claim 1 including:
   (a) means for weighing scrap metal loaded into said receptacle on said conveyor.

3. The invention of claim 1 wherein:
   (a) said heating zone includes one or more hoods disposed over said conveyor in each of which hoods there is a plurality of burners at which a combustible mixture is burned to generate heat.

4. The invention of claim 1 wherein:
   (a) said means to tilt said receptacle includes a cylinder-piston arrangement that is engageable with said receptacle.

5. Apparatus for preheating and charging scrap metal into a metallurgical furnace comprising:
   (a) a driven endless conveyor having one end located adjacent said furnace and provided with a plurality of support pads;
   (b) at least one scrap preheating and charging receptacle adapted to be supported on said pad;
   (c) one or more hoods disposed over said receptacle as it moves along said conveyor in each of which hoods there is a plurality of burners at which a combustible mixture is burned to generate heat to preheat scrap metal in said receptacle;
   (d) means for weighing the scrap metal loaded into said receptacle on said pads;
   (e) a cylinder-piston arrangement that is engageable with said receptacle to remove said receptacle from said conveyor; and
   (f) means adapted to cooperate with said cylinder-piston arrangement to simultaneously tilt said receptacle and discharge the scrap metal into said furnace as said receptacle moves oppositely said furnace.

References Cited
UNITED STATES PATENTS

| | | | |
|---|---|---|---|
| 964,191 | 7/1910 | Steele | 214—21 |
| 2,836,309 | 5/1958 | McFeaters. | |
| 3,093,253 | 6/1963 | McFeaters et al. | 206—13 X |
| 3,372,635 | 3/1968 | Meyers | 263—8 X |
| 1,492,225 | 4/1924 | Scott. | |

ROBERT D. BALDWIN, Primary Examiner

U.S. Cl. X.R.

263—8; 214—21